(12) United States Patent
Lu et al.

(10) Patent No.: US 11,463,955 B2
(45) Date of Patent: Oct. 4, 2022

(54) METHOD FOR IMPLEMENTING LOW POWER CONSUMPTION ON STANDBY FOR BLUETOOTH SECURITY DEVICE AND BLUETOOTH SECURITY DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 287 days.

(21) Appl. No.: 16/473,642

(22) PCT Filed: Jan. 31, 2018

(86) PCT No.: PCT/CN2018/074737
§ 371 (c)(1),
(2) Date: Jun. 26, 2019

(87) PCT Pub. No.: WO2018/157689
PCT Pub. Date: Sep. 7, 2018

(65) Prior Publication Data
US 2020/0359318 A1 Nov. 12, 2020

(30) Foreign Application Priority Data
Feb. 28, 2017 (CN) .......................... 201710114547.8

(51) Int. Cl.
*H04W 52/02* (2009.01)
*H04W 4/80* (2018.01)
(Continued)

(52) U.S. Cl.
CPC .......... *H04W 52/0225* (2013.01); *G06F 1/12* (2013.01); *G06F 9/442* (2013.01); *H04W 4/80* (2018.02);
(Continued)

(58) Field of Classification Search
CPC ............... H04W 52/0225; H04W 4/80; H04W 52/0215; G06F 1/12; G06F 9/442; G06F 1/3278
See application file for complete search history.

(56) References Cited

U.S. PATENT DOCUMENTS 7,672,695 B1 *  3/2010  Rainnie ................ H04B 7/2603
                                                              455/574
9,271,232 B2     2/2016  Zhang et al.
(Continued)

*Primary Examiner* — Walter J Divito
*Assistant Examiner* — Anthony Luo
(74) *Attorney, Agent, or Firm* — Hammer & Associates, P.C.

(57) ABSTRACT

A method for implementing low power consumption on standby for a Bluetooth security device. The method comprises: a security module is waked up by a Bluetooth module and configures a working mode as the state of self; a security module determines whether data from the Bluetooth module is received by a fifth preset time; if yes, then executes a corresponding operation on the basis of the received data to produce an operation result, returns the operation result to the Bluetooth module, configures a low power consumption standby mode as the state of self, and waits to be waked up by the Bluetooth module; and if not, then configures the low power consumption standby mode as the state of self, and waits to be waked up by the Bluetooth module. The Bluetooth security device disclosed comprises the security module and the Bluetooth module, where the security module comprises a first configuration module, a first receiving module, a first determining module, an execution module, a first transmitting module, a second configuration module, and a waiting module. The method and the Bluetooth security device in the present invention are of great power saving effects, and the standby time of the Bluetooth security device is extended.

11 Claims, 6 Drawing Sheets

(51) Int. Cl.
 *G06F 1/12* (2006.01)
 *G06F 9/4401* (2018.01)
 *G06F 1/3234* (2019.01)

(52) U.S. Cl.
 CPC ....... *H04W 52/0216* (2013.01); *G06F 1/3278* (2013.01)

(56) References Cited

U.S. PATENT DOCUMENTS

| | | | |
|---|---|---|---|
| 10,182,328 B1* | 1/2019 | Maibach | G07F 19/209 |
| 2011/0299512 A1* | 12/2011 | Fukuda | G06F 1/189 |
| | | | 370/338 |
| 2016/0066122 A1* | 3/2016 | Kao | H04W 4/70 |
| | | | 455/418 |

* cited by examiner

METHOD FOR IMPLEMENTING LOW POWER CONSUMPTION ON STANDBY FOR BLUETOOTH SECURITY DEVICE AND BLUETOOTH SECURITY DEVICE

FIELD OF THE PRESENT INVENTION

The present invention relates to a method for realizing low-power dissipation standby of a bluetooth security device and a bluetooth security device in the electronic technology field.

PRIOR ART

With the rapid development of the mobile payment technology, more sophisticated technology and more portable are needed in the field of mobile payment. In prior art, in order to be more portable, the mobile payment device becomes smaller and smaller, however, the smaller the volume is, the smaller of the capacity of the battery is; thus, there are two modes, which are low-power dissipation standby mode and working mode, for the bluetooth security device to make the time of standby longer, in which the power dissipation of the low-power dissipation standby mode is about 2 mA, and the power dissipation of the working mode is about 10 mA. The technical solution realizing low-power dissipation in the prior art includes: a bluetooth security device is woken up by an upper computer, executes corresponding operation according to received data to obtain a processed result when the data is received from the upper computer, and returns the processed result to the upper computer and is still in the working mode, and the bluetooth security device turns down peripheral units after a preset duration since it is woken up by the upper computer, and then enters into a low-power dissipation standby mode; in the case that the bluetooth security device does not receive the data from the upper computer, the bluetooth device turns down the peripheral units after the preset duration since it is woken up by the upper computer, and then enters into the low-power dissipation standby mode. That means the bluetooth security device will be in a working mode during the preset duration no matter whether the data is received.

The disadvantage in the prior art is that the power saved by the low-power dissipation standby mode of the bluetooth security device is limited, the time of standby prolonged is not enough.

SUMMARY OF THE INVENTION

The object of the present invention is to provide a method for realizing low-power dissipation standby of a bluetooth security device and a bluetooth security device, in which the power can be well saved, the time of standby is long enough.

Thus, according to one aspect of the present invention, there is provided a method for realizing low-power dissipation standby of a bluetooth security device, which includes the following steps:

Step S1, a security module is woken by a bluetooth module, and setting a state of the security module as a working module;

Step S2, determining, by the security module, whether data is received from the bluetooth module in a fifth preset duration, if yes, going to Step S3; otherwise, going to S5;

Step S3, executing, by the security module, corresponding operation according to the received data to obtain a processed result;

Step S4, returning, by the security module, the processed result to the bluetooth module, and going to Step S5; and Step S5, setting, by the security module, the state of security module itself as a low-power dissipation standby mode, and waiting for being woken by the bluetooth module.

Preferably, the method above further includes the following steps:

Step H1, waiting, by the bluetooth module, for receiving data from the upper computer;

Step H2, setting, by the bluetooth module, the state of the bluetooth module itself as the working mode when the data is received from the upper computer, and waking up the security module;

Step H3, sending, by the bluetooth module, the data to the security module after the first preset duration;

Step H4, determining, by the bluetooth, whether the processed result is received from the security module in the second preset duration, if yes, sending the processed result to the upper computer, going to Step H5; otherwise, going to Step H5; and Step H5, setting, by the bluetooth module, the state of the bluetooth module itself as the low-power dissipation standby mode, and going to Step H1.

According to the other aspect of the present invention, there is provided a bluetooth module security device, which includes a security module and a bluetooth module; the security module includes a first setting module, a first receiving module, a first determining module, an executing module, a first sending module, a second setting module and a waiting module;

the first setting module is configured to set a state of the security module as a working mode when the security module is woken up by the bluetooth module;

the first receiving module is configured to receive data from the bluetooth module;

the first determining module is configured to determine whether the first receiving module receives the data from the bluetooth module in a fifth preset duration after the first setting module sets the state of the security module as the working mode;

the executing module is configured to execute corresponding operation according to the data received by the first receiving module to obtain a processed result when the first determining module determines that the first receiving module receives the data from the bluetooth module;

the first sending module is configured to return the processed result obtained by the executing module to the bluetooth module;

the second setting module is configured to set the state of the security module as the low-power dissipation standby mode when the first determining module determines that the first receiving module does not receive the data from the bluetooth module in the fifth preset duration; and to set the state of the security module as the low-power dissipation standby mode when the first sending module returns the processed result to the bluetooth module; and the waiting module is configured to wait for being woken up by the security module after the second setting module sets the state of the security module as the low-power dissipation standby mode.

Preferably, the bluetooth module further includes a first waiting for receiving module, a third setting module, a waking up and executing module, a second sending module, a second receiving module, a second determining module, a third sending module and a fourth setting module;

the first waiting for receiving module is configured to wait for receiving the data from the upper computer;

the third setting module is configured to set the state of the bluetooth module as the working mode when the first waiting for receiving module receives the data from the upper computer;

the waking up and executing module is configured to wake up the security module after the third setting module sets the state of the bluetooth module as the working mode;

the second sending module is configured to send the data received by the first waiting for receiving module from the upper computer after the first preset duration after the waking up and executing module wakes up the first preset;

the second receiving module is configured to receive the processed result from the security module;

the second determining module is configured to determine whether the second receiving module receives the processed result from the security module in the second preset duration after the second sending module sends the data received by the first waiting for receiving module from the upper computer to the security module;

the third sending module is configured to send the processed result received by the second receiving module to the upper computer after the second determining module determines that the second receiving module receives the processed result from the security module in the second preset duration;

the fourth setting module is configured to set the state of the bluetooth module as the low-power dissipation standby mode after the third sending module sends the processed result received by the second receiving module to the upper computer; and to set the state of the bluetooth module as the low-power dissipation standby mode after the second determining module determines that the second receiving module does not receive the processed result from the security module in the second preset duration; and the first waiting for receiving module is further configured to wait for receiving the data from the upper computer after the fourth setting module sets the state of the bluetooth module as the low-power dissipation standby mode.

Compared with the prior art, the advantage of the present disclosure is that in a bluetooth security device, the security module will set the state of the security module itself as the low-power dissipation standby mode when the security module determines that no data is received and the processed result is returned to the bluetooth module, in this way, the duration for standby of the bluetooth security device is prolonged.

BRIEF DESCRIPTION OF ACCOMPANYING DRAWINGS

DETAILED DESCRIPTION OF THE INVENTION

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

It provides a method for realizing low-power dissipation standby of the bluetooth security device, which applies to a bluetooth security device including a security module and a bluetooth module, and the method specifically includes an operational method of the security module and an operational method for the bluetooth module.

Figure 1:
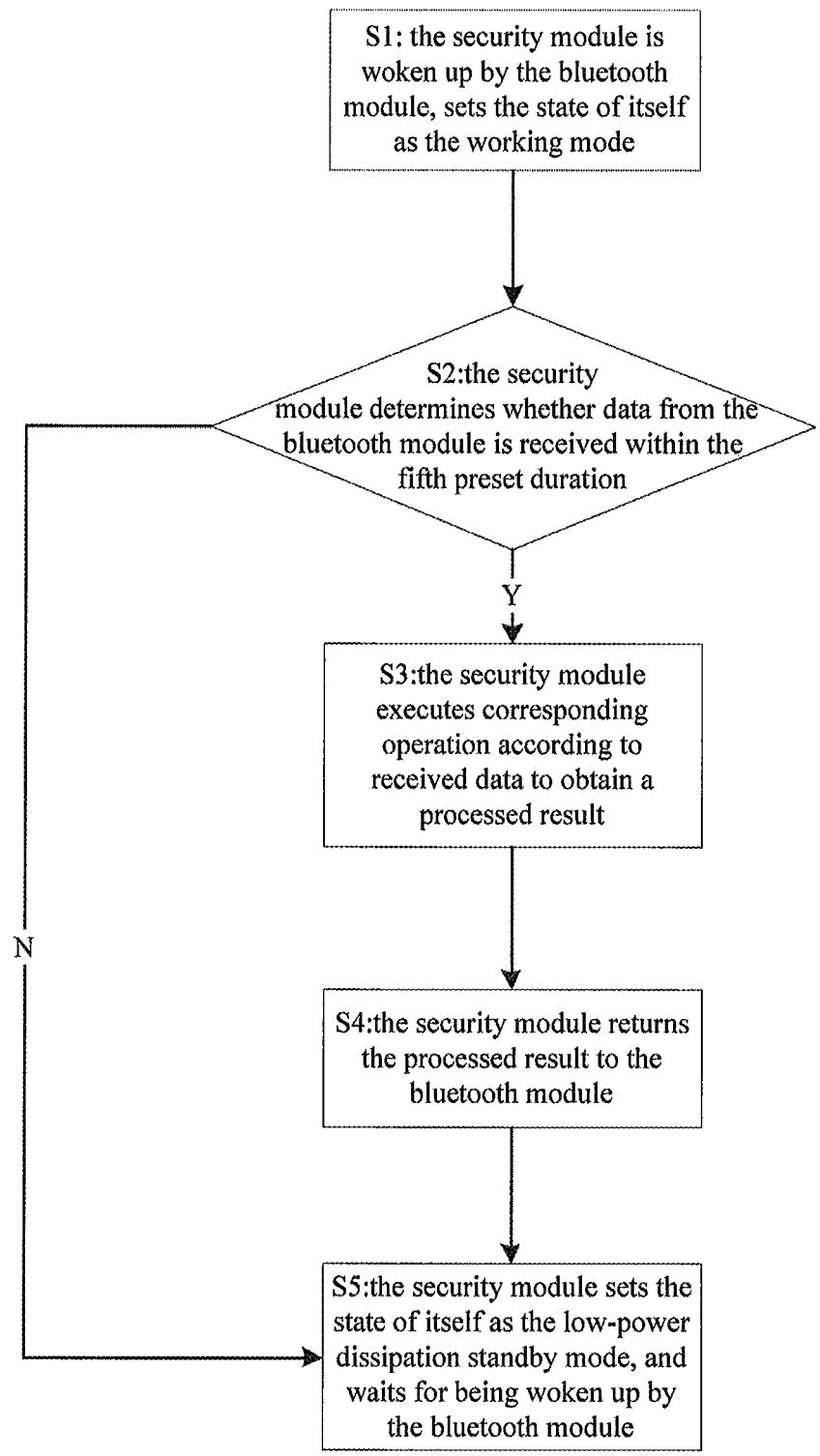
FIG. 1 shows a flow diagram of an operation method for a security module which realizes the low-power dissipation standby of a bluetooth security device according to Embodiment 1 of the present invention.

As shown in FIG. 1, the operational method for the security module includes following steps:

Step S1, the security module is woken up by the bluetooth module, and set a state of the security module as a working mode;

Step S2, the security module determines whether data is received from the bluetooth module in the fifth preset duration, if yes, goes to Step S3; otherwise, goes to Step S5;

Step S3, the security module executes corresponding operation according to the received data to obtain a processed result;

Step S4, the security module returns the processed result to the bluetooth module, and goes to Step S5; and Step S5, the security module sets the state of the security module itself as a low-power dissipation standby module, waits for being woken up by the bluetooth module.

Figure 2:
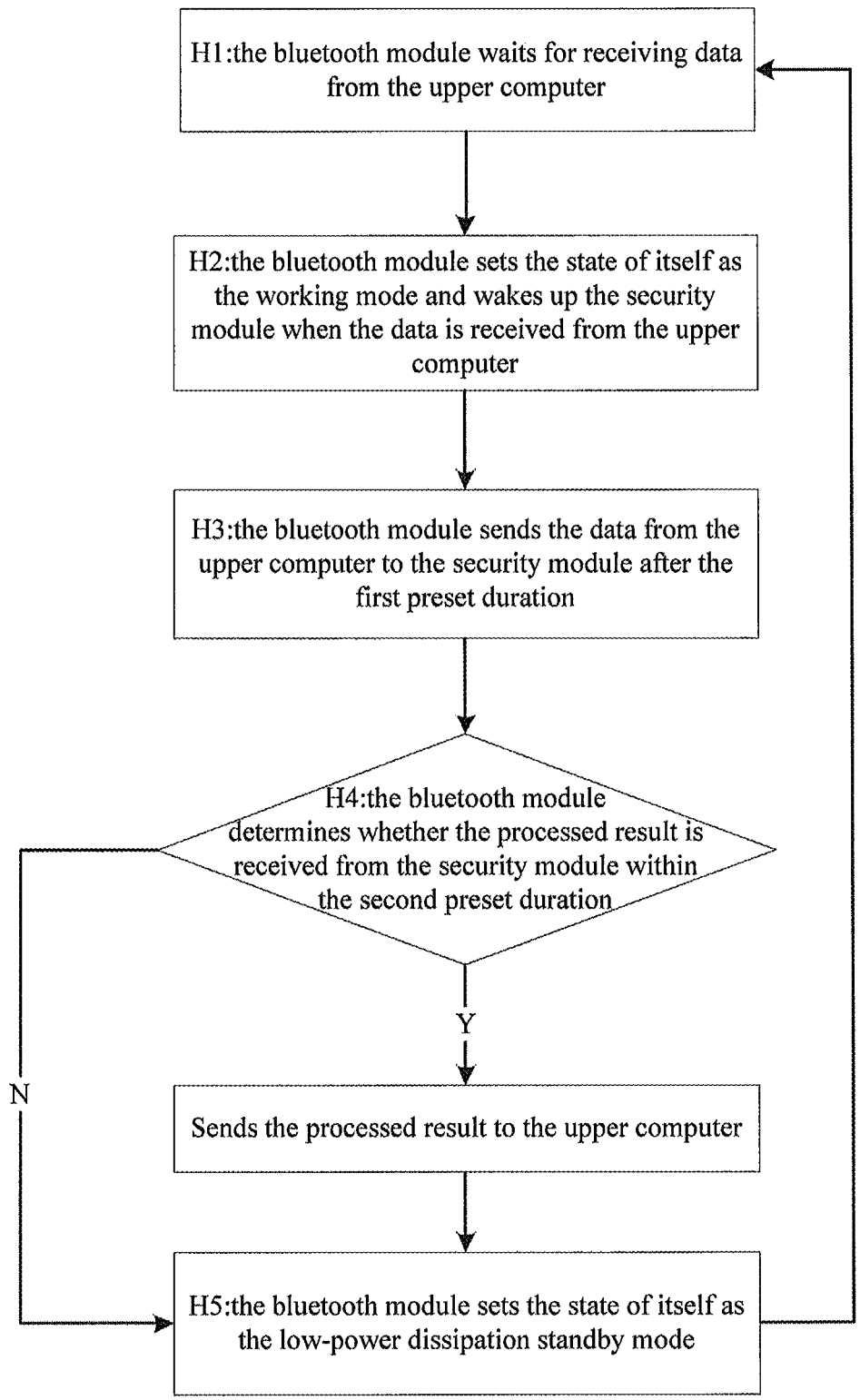
FIG. 2 shows a flow diagram of an operation method for a bluetooth module which realizes the low-power dissipation standby of the bluetooth security device according to Embodiment 1 of the present invention.

The operation method for the bluetooth module, as shown in FIG. 2, includes the following steps:

Step H1, the bluetooth module waits for receiving data from an upper computer;

Step H2, the bluetooth module sets the state of the bluetooth module itself as the working mode and wakes up the security module when the data is received from the upper computer;

Specifically, that the bluetooth module sets the state of the bluetooth module itself as the working mode specifically includes: the bluetooth module starts up independent modules of the bluetooth module itself. Furthermore, that the bluetooth sets the state of bluetooth itself as the working mode further includes the bluetooth module sets a clock of the bluetooth module itself in a high-speed clock mode. Furthermore, that the bluetooth module sets the state of the bluetooth module itself as the working mode further includes the bluetooth module starts up peripheral units connecting to itself.

Specifically, that the bluetooth module wakes up the security module specifically includes: the bluetooth module takes down an electronic level of a first control pin which connects to the security module.

Step H3, the bluetooth module sends the data from the upper computer to the security module after the first preset duration;

Step H4, the bluetooth determines whether the processed result is received from the security module within the second preset duration, if yes, sends the processed result to the upper computer, goes to Step H5; otherwise, goes to Step H5;

Step H5, the bluetooth module sets the state of the bluetooth module itself as the low-power dissipation standby mode, and goes to Step H1;

Furthermore, after the bluetooth module sends the processed result to the upper computer, and before Step H5, the method further includes:

Step A1, the bluetooth module determines whether a bluetooth connection is disconnected, if yes, organizes a disconnecting instruction, wakes up the security module, and goes to Step A2; otherwise, goes to Step H5;

Specifically, that the bluetooth module wakes up the security module specifically includes: the bluetooth module takes down the electronic level of the first control pin which connects to the security module.

Step A2, the bluetooth module sends the disconnecting instruction to the security module after the third preset duration;

Step A3, the bluetooth module sets the state of the bluetooth module itself as a deep-power saving mode when a response of the disconnecting instruction is received from the security module in the fourth preset duration.

Correspondingly, after Step S2 and before Step S3, the method further includes that the security module determines whether the received data is the disconnecting instruction, if yes, goes to Step S6; otherwise, goes to Step S3;

Step S6, the security module organizes the response of the disconnecting instruction, and returns the response of the disconnecting instruction to the bluetooth module.

Specifically, that the bluetooth module sets the state of the bluetooth module itself as the deep power saving mode in Step A3 specifically is that the bluetooth module sets the state of the bluetooth module itself as a deep sleep mode;

Correspondingly, after Step S6, the method further includes the security module sets the state of security device itself as the deep sleep mode;

Or, that the bluetooth module sets the state of the bluetooth module itself as the deep power saving mode in Step A3 specifically is that the bluetooth module executes an operation of closing down operation.

More specifically, that the bluetooth module sets the state of the bluetooth module itself as the deep sleep mode specifically is that the bluetooth module closes down peripheral units connecting to itself and dependent modules of the bluetooth module itself, and makes sure the waking up module of the bluetooth module itself has power, and powers down a main nucleus of the chip.

Correspondingly, that the security module sets the state of the security module itself as the deep sleep mode specifically is that the security module closes down the peripheral units connecting to itself and dependent module of the security module itself, makes sure the waking module of the security module itself has power, and powers down the main nucleus of the chip of the security module itself.

Preferably, Step A3 specifically includes:

Step A31, the bluetooth module waits for a fourth sub preset duration, determines whether the response of the disconnecting instruction is received from the security module, if yes, sets the state of the bluetooth module itself as the deep power saving mode; otherwise, goes to Step A32;

Step A32, the bluetooth module determines whether a duration between the time for sending the disconnecting instruction to the security module for the first time and a current time is longer than the fourth preset duration;

Step A33, the bluetooth module sends the disconnecting instruction to the security module in the case that the bluetooth module determines that the duration between the time for sending the disconnecting instruction to the security module for the first time and the current time is not longer than the fourth preset duration, and goes to Step A31.

Furthermore, the above method further includes: goes to Step H5 or sets the state of the bluetooth module itself as the deep power saving mode when the bluetooth module determines that the duration is longer than the fourth preset duration.

Preferably, Step H4 specifically includes:

Step H41, the bluetooth waits for a second sub preset duration, and determines whether the processed result is received from the security module, if yes, sends the processed result to the upper computer, and goes to Step H5; otherwise, goes to Step H42;

Step H42, the bluetooth module determines whether a duration between a time for sending the data from the upper computer to the security module for the first time and the current time is longer than the second preset duration, if yes, goes to Step H5; otherwise, goes to Step H43;

Step H43, the bluetooth module re-sends the data from the upper computer to the security module, and goes to Step H41.

Preferably, when the bluetooth sends the processed result to the upper computer, Step H4 further includes:

Step L, the bluetooth module determines whether a sending finished flag is set, if yes, the sending is finished, goes to Step H5; otherwise, continues to determine.

Furthermore, when the bluetooth module determines that the sending finished flag is not set, before continues to determine, Step L further includes:

the bluetooth module determines whether a duration between a time for receiving the processed result from the security module and the current time is longer than a sixth preset duration, if yes, goes to Step H5; otherwise, continues to determine.

In the above method as disclosed in Embodiment 1, when the security module determines that the data from the bluetooth module is received in the fifth preset duration in Step S2, before Step S4, the method further include:

the security module determines whether a process controlling is set according to the received data, the security module sets a process controlling timer by using a low-power dissipation timer according to the received data in the case that the process controlling is set.

The above method as disclosed in Embodiment 1 further includes: the security module sets the state of the security module itself as the working mode when the security module is woken up by a process controller, executes corresponding operation to obtain the processed result, saves the processed result, and sets the state of the security module itself as the low-power dissipation standby mode.

The above method as disclosed in Embodiment 1 further includes: the security module sets the state of the security module itself as the working mode when the security module is woken up by a key, executes corresponding operation to obtain the processed result, saves the processed result and sets the state of the security module itself as the low-power dissipation standby mode.

In the above method as disclosed in Embodiment 1, Step S2 specifically includes: Step S21, the security module determines whether the data is received, if yes, goes to Step S3; otherwise, goes to Step S22;

Step S22, the security module determines whether the duration between a time for setting the state of the security module itself as the working mode and the current time is longer than the fifth preset duration, if yes, goes to Step S5; otherwise, goes to Step S21.

In the above method of Embodiment 1, that the security module sets the state of the security module itself as the working mode specifically is the security module sets the clock of the security module itself in the high-speed clock mode, and starts up the dependent module of the security module itself.

Furthermore, when the security module sets the state of the security module itself as the working mode, the method further includes: the security module starts the peripheral units connecting to itself. For instance, the peripheral unit, which connects to the security module, in the bluetooth security device is a display module.

In the present invention, the dependent modules in the security module include a communication module, an algorithm module and a storing module, for instance, the communication module can be but not limited to be one or multiple of Universal Asynchronous Receiver/Transmitter (UART) module/Serial Peripheral Interface (SPI) module/Inter-Integrated Circuit (I2C) module/Universal Serial Bus (USB) module, the storing module can specifically is a flash storing module.

It needs to be noted that, in the present invention, the security module can specifically include a security chip and peripheral circuit connecting to the security chip, and dependent modules, such as a communication module, a storing module or an algorithm module, integrated in the security chip; the security module can also include the security chip, dependent modules and the peripheral circuits connecting to the security chip, in which, the dependents modules can integrated in the security chip or be a dependent structure connecting to the security chip, for instance, the communication module of the dependent module is integrated in the security chip, and the algorithm module of the dependent module is a dependent structure. The present invention does not limit the peripheral circuits connecting to the security chip.

In the above method of Embodiment 1, that the security module sets the state of the security module itself as the low power dissipation standby mode specifically includes: the security module sets the clock of the security module itself as the low-speed clock mode, closes down the dependents module of the security module itself and the peripheral devices connecting to the security module, and sets the chip of the security module itself as a sleep mode.

In Embodiment 1, the bluetooth module sets the state of the bluetooth module itself as the low-power standby mode specifically is that the bluetooth module closes down the dependent modules of the bluetooth module itself.

Furthermore, when the bluetooth module sets the state of the bluetooth module itself as the low-power standby mode, the method further includes: the bluetooth module sets the clock of the bluetooth module itself as the low speed clock mode, and sets the chip of the bluetooth module itself as the sleep mode.

In the present invention, the dependent modules in the bluetooth module include the communication module, for instance, the communication module can be but not limited to be one or multiple of Universal Asynchronous Receiver/Transmitter (UART) module, Serial Peripheral Interface (SPI) module and Inter-Integrated Circuit (I2C) module.

It needs to be noted that the bluetooth module in the present invention can specifically be one bluetooth chip and peripheral circuits connecting to the bluetooth chip, and the dependent module (the communication module) is integrated in the bluetooth chip; the bluetooth module can include the bluetooth chip, dependent modules and peripheral circuits connecting to the bluetooth chip, in which, the dependent module can be integrated in the bluetooth chip or be a dependent structure connecting to the bluetooth chip, for instance, the communication module of the dependent modules can be integrated in the bluetooth chip or be a dependent structure connecting to the bluetooth chip. The present invention does not limit the peripheral circuits connecting to the bluetooth chip.

In the present invention, the chip of the bluetooth module and the bluetooth chip, which are mentioned above, belong to the same concept; the chip of the security module and the security chip, which are mentioned above, belong to the same concept.

Compared with the prior art, the advantage of the present invention is that the security module in the bluetooth security device sets the state of the security module itself as the low-power dissipation standby mode immediately when the security module determines that no data is received and after the processed result is returned to the bluetooth module, the present invention will save more power than the method in the prior art, and prolongs the duration of standby of the bluetooth security device.

The security module will enter the low-power dissipation standby mode immediately after processing corresponding operation, meanwhile, the bluetooth module will enter the low-power dissipation standby mode immediately after returning the processed result from the security module to the upper computer, the method in the present invention can prolong the duration of standby of the bluetooth security device compared with the prior art.

Additionally, compared with the prior art which just close down the low-power dissipation standby mode of the peripheral devices, the clock of the security module and the clock of the bluetooth module will changed into the low-speed clock mode when the security module and the bluetooth module is in the low-power dissipation standby mode according to the present invention.

Embodiment 2

It provides a method for realizing the low-power dissipation standby of a bluetooth security device, the bluetooth security device includes a bluetooth module and a security module.

Figure 3:
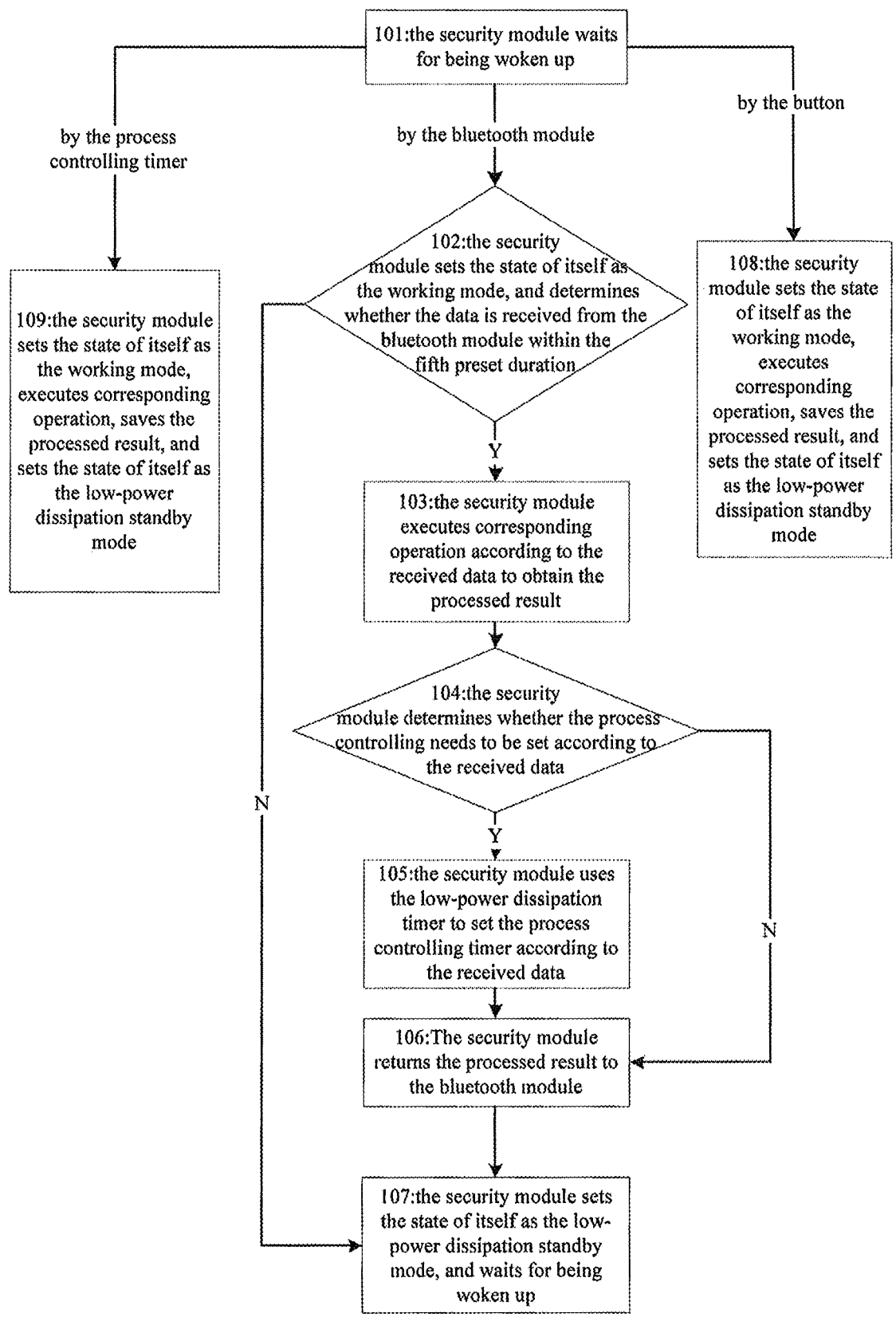
FIG. 3 shows a flow diagram of an operation method for a security module which realizes the low-power dissipation standby of a bluetooth security device according to Embodiment 2 of the present invention.

As shown in FIG. 3, the operational steps of the security module specifically include:

Step 101, the security module waits for being woken up, and goes to Step 102 when the security module is woken up by the bluetooth module; goes to Step 108 when the security module is woken up by a key; goes to Step 109 when the security module is woken up by a process control timer.

In Embodiment 2, the security module is in a low-power dissipation standby mode when it waits for being woken up.

Step 102, the security module sets the state of the security module itself as a working mode, and determines whether data from the bluetooth module is received in a fifth preset duration, if yes, goes to Step 103; otherwise, goes to Step 107.

Specifically, the security module determining whether the data is received in the fifth preset duration specifically includes:

Step 1021, the security module determines whether the date is received, if yes, goes to Step 103; otherwise, goes to Step 1022;

Step 1022, the security module determines whether the duration between the time for setting the state of the security module itself as the working mode and a current time is longer than the fifth preset duration, if yes, sets the state of the security module itself as the low-power dissipation standby mode, waits for being woken up by the bluetooth module; otherwise, goes to Step 1021. For instance, the fifth preset duration is 30 ms.

Preferably, when the security module determines that the duration between the time for setting the state of the security module itself as the working mode and the current time is not longer than the fifth preset duration, before Step 1021, Step 1022 further includes: the security module waits for the fifth sub preset duration. For instance, the fifth sub preset duration is 10 ms.

Specifically, the security module determining whether data is received specifically is the security module determines whether a flag bit of a state register is a preset flag for receiving data, if yes, the data is received; otherwise, the data is not received. In Embodiment 2, the security module will sets the flag bit of the state register as the preset flag for receiving data automatically when the data is received, for instance, the preset flag for receiving data is 1.

Step 103, the security module executes corresponding operation according to the received data to obtain a processed result;

Specifically, Step 103 is that a random number, which is the obtained processed result, is generated when an obtaining random number instruction is received; for instance, the generated random number is 00011001;

amending PIN code operation is executed when an amending PIN code instruction is received, a state code of the amending PIN code instruction is organized to obtain a processed result which is as the state code of the amending PIN code instruction;

key data information in a signing instruction is displayed when the signing instruction is received, and a state code of the signing instruction is organized to obtain a processed result which is made as the state code of the signing instruction;

the saved signing result is obtained, when an obtaining signing result is received, to obtain a processed result which is made as the signing result;

the saved key state is obtained, when an obtaining key state instruction is received, to obtain a processed result which is made as the key state obtained.

Step 104, the security module determines whether the process control is needed to be set according to the received data, if yes, goes to Step 105; otherwise, goes to Step 106;

Specifically, that the security module determines whether the process control is needed to be set according to the received data specifically is that the security module invokes a corresponding applet interface according to the received data, and determines whether the process control is needed to be set according to the applet interface which is invoked.

For instance, a corresponding applet interface is invoked when the received data is one of the obtaining random number instruction, the obtaining signing result instruction and the obtaining key state instruction, Step 106 is executed when the corresponding applet interface determines that the process control is not needed to be set; the corresponding applet interface is invoked and Step 105 is executed when the corresponding applet interface determines that the process control is needed to be set.

Step 105, the security module uses a low-power dissipation timer to set the process control timer according to the received data.

Specifically, the security module uses the low-power dissipation timer to set the process timer reaches a preset time after a preset duration.

For instance, when the data received from the security module is the amending PIN code instruction, after executing the amending PIN code instruction, the security module uses the low-power dissipation timer to set the process timer reaches the preset time after five seconds; when the data received by the security module is the signing instruction, after executing the signing instruction, the security module uses the low-power dissipation timer to set the process timer reaches the preset time after five seconds.

Step 106, the security module returns the processed result to the bluetooth module.

Specifically, the security module returns the random number to the bluetooth module in the case that the received data is the obtaining random number instruction; the security module returns the state code of the amending PIN code instruction to the bluetooth module in the case that the received data is the amending PIN code instruction; the security module returns the state code of the signing instruction to the bluetooth module in the case that the received data is the signing instruction; the security module returns the saved signing result to the bluetooth module in the case that the obtaining signing result instruction is received; the security module returns the saved key state to the bluetooth module in the case that the obtaining key state instruction is received.

Step 107, the security module sets the state of the security module itself as the low-power dissipation standby mode, and waits for being woken up.

In Embodiment 2, after the security module determines that there is no data is received in Step 102 and the security module returns the processed result to the bluetooth module in Step 106, the security module enters into the low-power dissipation standby mode directly; when the security module receives the data in Step 102, after steps from Step 103 to Step 105, the security module enters into the low-power dissipation standby mode after the processed result is returned to the bluetooth module in Step 106. That means, in the present invention, after determining that no data is received or the data is processed and the processed result is returned to the bluetooth module, the security module enters into the low-power dissipation standby mode immediately, in this way, the method can save more power to ensure the duration of standby of the bluetooth security device is prolonged compared with the prior art.

Step 108, the security module sets the state of security module itself as the working mode, and executes corresponding operation, and saves the processed result, and sets the state of the security module itself as the low-power dissipation standby mode.

Specifically, in Step 108, that the security executes corresponding operation and saves the processed result specifically is that the security module executes corresponding operation according to the key, and saves the processed result. After Step 108, the security module is woken up by the bluetooth module, and then returns the processed result to the bluetooth module when the obtaining key state instruction from the bluetooth module is received.

Step 109, the security module sets the state of security module itself as the working mode, and executes corresponding operation, saves the processed result and sets the state of the security module itself as the low-power dissipation standby mode.

Specifically, in Step 109, that the security module executes corresponding operation and saves the processed result specifically is that the security module sets a time-out flag, and saves the time-out flag.

Specifically, Step 109 specifically includes: the security module sets the state of the security module itself as the working mode, sets the time-out flag, saves the time-out flag, and sets the state of the security module itself as the low-power dissipation standby mode. After Step 109, the security module is woken up by the bluetooth module, receives the obtaining key state instruction from the bluetooth module, and returns the time-out flag to the bluetooth module.

Take that the data received from the security module in Step 102 is the signing instruction as an example, the security module goes to Step 103, which specifically is displaying the key data information in the signing instruction and organizing the state code of the signing instruction to obtain the processed result as the state of the signing instruction, when receiving the signing instruction, in the case that the security module determines that the process control is needed to be set in Step 104, after steps from Step 105 to Step 107, the security module is in the low-power dissipation standby mode, and waits for receiving a notice of confirming signature from the user, after Step 107, the method includes following circumstance: the security module executes Step 108, which specifically is that the security module sets the state of the security module itself as the working mode, executes the signing operation, and saves the signing result, and sets the state of the security module itself as the low-power dissipation standby mode, when the security module is woken up by the key in the preset duration set by the process control timer, and receives the notice of confirming signature; the security module executes Step 108, which is specifically is that the security module sets the state of the security module itself as the working mode, organizes a response of cancelling signature, and saves the response of cancelling signature, and sets the state of the security module itself as the low-power dissipation standby mode, when the security module is woken up by the key in the preset duration set by the process control timer, and receives the notice of cancelling signature; the security module is woken up by the process control timer and executes Step 109 when the security module does not be woken up in the preset duration set by the process control timer.

Specifically, the security module is woken up by the key, and receives the notice of confirming signature after the user presses the OK button; the security module is woken up and receives the notice of cancelling signature after the user presses the Cancel button; the security module is woken up by the process control timer and executes Step 109 when the user does not press the OK button or the Cancel button in the preset duration set by the process control timer and the process control timer reaches the preset time.

Take that the data received by or from the security module in Step 102 is the amending PIN code instruction as an example, the security module executes Step 103, which specifically is that amends the PIN code, organizes the state code of the amending PIN code instruction to obtain the processed result as the state code of amending PIN code instruction, when the data received by the security module in Step 102 is the amending PIN code instruction; when the process control is needed to be set is determined in Step 104, after executing steps from Step 105 to Step 107, the security module is in the low-power dissipation standby mode, waits for receiving the notice of confirming to amend PIN code, after Step 107, the method includes several circumstance: when the security module is woken up in the preset duration set by the process control timer, and receives the notice of confirming to amend PIN code, the security module executes Step 108, which specifically is the security module sets the state of the security module itself as the working mode, amends the PIN code, and organizes the state code of amending PIN code successfully, and sets the state of the security module itself as the low-power dissipation standby mode after the state code of the amending PIN code is saved; when the security module is woken up in the preset duration set by the process control timer, and receives the notice of cancelling amending state code of the PIN code, executes Step 108, which specifically is the security module sets the state of security module itself as the working mode, organizes the state code of failing to amend PIN code, and sets the state of security module itself as the low-power dissipation standby mode after saving the state code of failing to amend PIN code; when the security module is not woken up in the preset duration set by the process control timer and the process control timer reaches the preset time, the security module is woken up by the process control timer and executes Step 109.

Specifically, the security module is woken up by the key after the user press OK button, and receives the notice of confirming to amend PIN code from the user; the security module is woken up by the key after the user press Cancel button, and receives the notice of cancelling amending PIN code; the security module is woken up by the process control timer when the user does not press OK or Cancel button in the preset duration set by the process control timer and the process control timer reaches the preset time, and executes Step 109.

Figure 4:
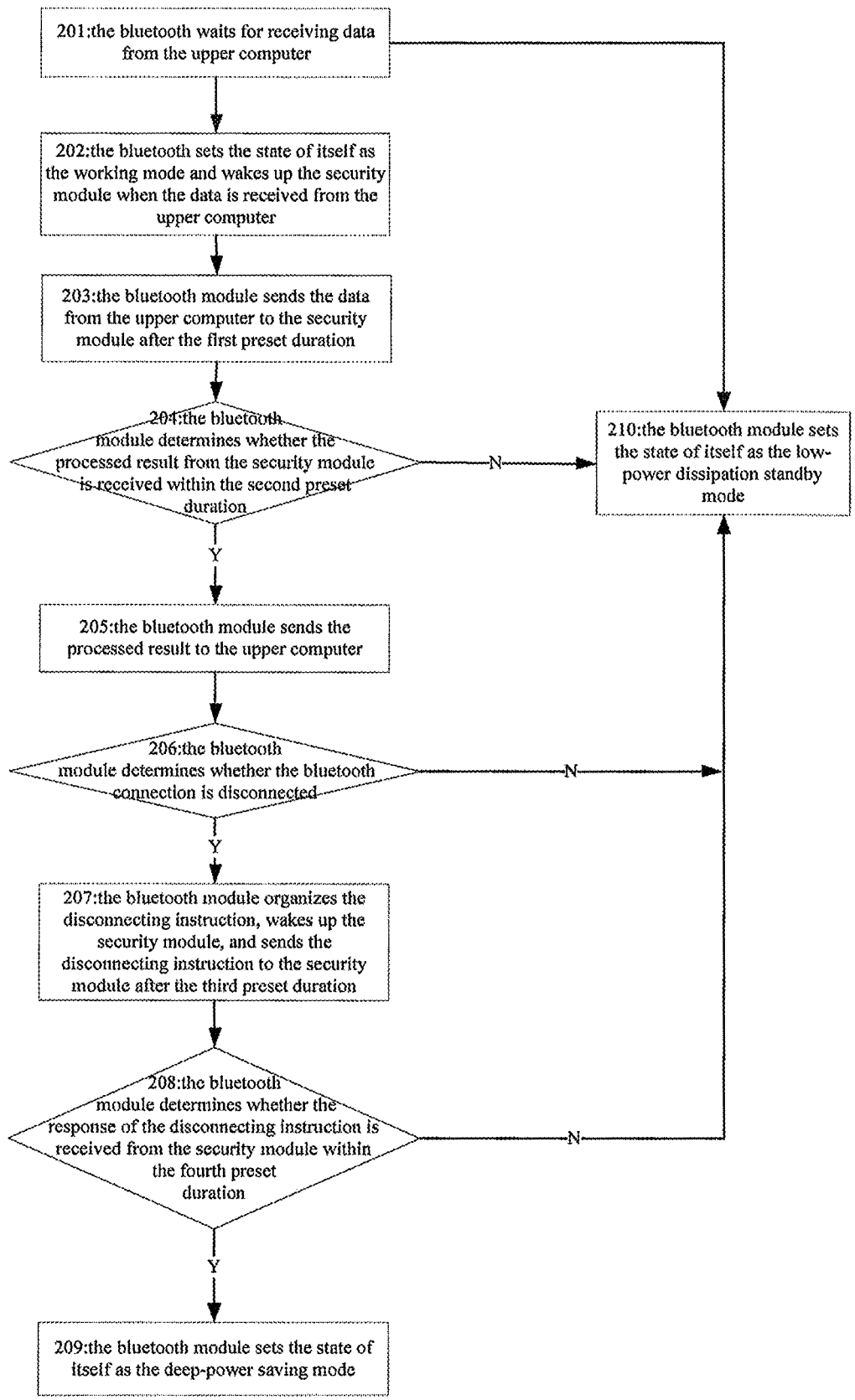
FIG. 4 shows a flow diagram of an operation method for a bluetooth module which realizes the low-power dissipation standby of the bluetooth security device according to Embodiment 2 of the present invention.

As shown in FIG. 4, the bluetooth module executes the following steps:

Step 201, the bluetooth module waits for receiving data from the upper computer;

Specifically, the bluetooth module is in the low-power dissipation mode when waiting for receiving the data from the upper computer. The clock is in the low-speed clock mode when the bluetooth is in the low-power dissipation standby mode. For instance, the clock frequency is 0.07 MHz when the bluetooth module is in the low-power standby mode.

In Embodiment 2, the upper computer is a terminal which supports a bluetooth function, for instance, the mobile terminal or a computer terminal.

Step 202, the bluetooth sets the state of bluetooth itself as the working mode when the bluetooth module receives the data from the upper computer, and wakes up the security module;

Specifically, the data received by the bluetooth from the bluetooth module is one of the obtaining random instruction, the signing instruction, the obtaining signing result instruction, the obtaining key state instruction and the amending PIN code instruction.

For instance, the obtaining random instruction is 0x0084000008.

Step 203, the bluetooth module sends the data received from the upper computer to the security module after the first preset duration;

For instance, the preset duration is 10 ms.

Step 204, the bluetooth module determines whether the processed result is received from the security module in the second preset duration, if yes, goes to Step 205; otherwise, goes to Step 210;

Specifically, Step 204 specifically includes:

Step 2041, the bluetooth waits for the second sub preset duration, determines whether the processed result is received from the security module, if yes, sends the processed result to the upper computer, and goes to Step 205; otherwise, goes to Step 2042. For instance, the second sub preset duration is 10 ms.

Step 2042, the bluetooth module determines whether the duration between the time for sending the data received from the upper computer to the security module for the first time and the current time is longer than the second preset duration, if yes, goes to Step 210; otherwise, goes to Step 2043. For instance, the second preset duration is 30 ms.

Step 2043, the bluetooth module re-send the data from the upper computer to the security module, and goes to Step 2041.

Step 205, the bluetooth module sends the processed result to the upper computer.

Preferably, when the bluetooth module sends the processed result to the upper computer in Step 205, the step further includes:

Step L, the bluetooth module determines whether a sending-finished flag is set, if yes, the pressed result is sent to the upper computer, Step 206 is executed; otherwise, continues to send the processed result.

Preferably, after the bluetooth module determines that the sending-finished flag is not set, before continuing to determine, Step L further includes: the bluetooth module determines whether the duration between the time for receiving the processed result from the security module and the current time is longer than the sixth preset duration, if yes, goes to Step 210; otherwise, continues to determine.

Step 206, the bluetooth module determines whether the bluetooth connection is disconnected, if yes, goes to Step 207; otherwise, goes to Step 210;

Specifically, the bluetooth module determining whether the bluetooth connection is disconnected specifically includes: a bluetooth chip in the bluetooth module determines whether a bluetooth disconnecting event is monitored, if yes, the bluetooth connection is disconnected; otherwise, the bluetooth connection is connected.

More specifically, a bluetooth protocol stack checks whether heart beats exist in a preset duration, if yes, the bluetooth chip cannot monitor the bluetooth disconnecting event in the bluetooth protocol stack, and the bluetooth module determines that the bluetooth connection is not disconnected; otherwise, the bluetooth protocol stack occurs the bluetooth disconnecting event, the bluetooth chip monitors the bluetooth disconnecting event in the bluetooth protocol stack, and the bluetooth module determines that the bluetooth connection is disconnected.

Step 207, the bluetooth module organizes a disconnecting instruction, wakes up the security module, and sends the disconnecting instruction to the security module after the third preset duration. For instance, the third preset duration is 10 ms.

For instance, the disconnecting instruction organized by the bluetooth module is 6B08000000000103.

Step 208, the bluetooth module determines whether a response of the disconnecting instruction from the security module is received in the fourth preset duration, if yes, goes to Step 209; otherwise, goes to Step 210.

Correspondingly, after Step 102, and before Step 103, the method further includes:

Step 110, the security module determines whether the received data is the disconnecting instruction, if yes, goes to Step 111; otherwise, goes to Step 103;

Step 111, the security module organizes the response of the disconnecting instruction, and returns the response of the disconnecting instruction to the bluetooth module.

Specifically, Step 208 specifically includes:

Step 2081, the bluetooth module waits for a fourth sub preset duration, and determines whether the response of the disconnecting instruction is received from the security module, if yes, goes to Step 209; otherwise, goes to Step 2082; for instance, the fourth sub preset duration is 10 ms.

Step 2082, the bluetooth module determines whether the duration between the time for sending the disconnecting instruction to the security module for the first time and the current time is longer than the fourth preset duration, if yes, goes to Step 210 or goes to Step 209; otherwise, goes to Step 2083. For instance, the fourth preset duration is 30 ms.

Step 2083, the bluetooth module resends the disconnecting instruction to the security module, and goes to Step 2081.

Step 209, the bluetooth module sets the state of bluetooth module itself as the deep-energy saving mode.

Step 210, the bluetooth module sets the state of bluetooth module itself as low-power dissipation standby mode.

Optionally, the bluetooth module setting the state of bluetooth module itself as deep-energy saving mode specifically is that the bluetooth module sets the state of bluetooth module itself as the deep sleep mode.

Correspondingly, after Step 111, the method further includes: the security module sets the state of security module itself as the deep sleep mode.

Specifically, the security module setting the state of security module itself as the deep sleep mode specifically is that the security module closes down the peripheral units connecting to it and dependent module of it, keeps the waking up module itself has power, and powers down the chip core of the security module;

Specifically, the bluetooth module setting the state of bluetooth module itself as the deep sleep mode specifically is that the bluetooth module closes down the peripheral units connecting to it and dependent module of it, keeps the waking up module itself has power, and powers down the chip core of the bluetooth module itself;

When being in the deep sleep mode, the security module and the bluetooth module close down the peripheral units connecting to them and the dependent modules of them, and after the chip core in the modules powers down, the clock is in a closing state, the electricity is in nA level which means the power dissipation is about 40 nA, in this way, the method can save more power; comparing to the off mode, the modules can be woken up from the deep sleep mode quickly to the working mode, and respond the requests from the peripheral units.

In deep sleep mode, only the chips in the modules are powered down by the bluetooth module and the security module, the peripheral units which dissipate lots of power is closed down, and the waking up module keeps to have power; when the modules are woken up by the waking up module, the chips in the modules are powered on, the clock frequency is set, it does not need to initialize all the devices in the method, thus the modules are woken up faster than in a close down state.

In Embodiment 2, the bluetooth module enters into the deep-sleep mode when the bluetooth connection is disconnected, comparing to the solution that the device is turned off when the bluetooth connection is disconnected, the method wastes less time when bluetooth module transfers from the deep sleep mode to the working mode for receiving the data from the upper computer, that makes the user feel better; the power dissipation is at nA level which is more than that in a close down mode.

Optionally, the bluetooth module setting the state of the bluetooth module itself as the deep energy saving mode in Step 209 specifically is that the bluetooth module executes the close down operation.

In Embodiment 2, when the bluetooth connection of the bluetooth module is disconnected, after the bluetooth module executes the close down operation, the bluetooth security device is totally powered off, the power dissipation is 0, in this way, the power is saved, but all of the devices need to be initialized when starting up, the speed of starting up is slower than the deep sleep mode. The bluetooth module and the security module can share one power module, the bluetooth module executes the close down operation when receiving the response of the disconnecting instruction from the security module, disconnects the power, and the security module disconnects the power meanwhile.

In Embodiment 2, the bluetooth module setting the state of the bluetooth module itself as the low power dissipation standby module specifically includes that the bluetooth module closes down the peripheral units connecting to itself and dependent module of the bluetooth module itself. Furthermore, when the bluetooth module sets the state of the bluetooth module itself as the low power dissipation standby mode, the method includes that the bluetooth module sets the clock of the bluetooth module itself as the low speed clock, and sets the chip of the bluetooth module itself as the sleep mode. For instance, the clock frequency of the low speed clock mode is 0.7 MHz.

It needs to note that, the dependent module in the bluetooth module in Embodiment 2 includes but not limited to the communication module which can include but not limit to Universal Asynchronous Receiver/Transmitter (UART) module or Serial Peripheral Interface (SPI) module or Inter-Integrated Circuit (I2C) module.

In Embodiment 2, that the security module sets the state of the security module itself as the low-power dissipation standby mode specifically includes the security module sets the clock of the security module itself as the low speed clock mode, closes down the dependent module of the security module itself and the peripheral units connecting to the security module, and sets the chip of the security module itself as the sleep mode.

For instance, the security module sets the clock frequency of the security module itself, which is 2.5 MHz, as 0.07 MHz;

Specifically, the security module closing down the peripheral units connecting to the security module specifically is closing down the peripheral units, which dissipates a lot of power, connecting to the security module. For instance, the displaying module connecting to the security module is closed down.

Specifically, the dependent modules in the security module include the communication module, the algorithm module and the storing module. For instance, the algorithm module can include but not limit to SM4 algorithm module, SM1 algorithm module, Hash algorithm module or Sha2 algorithm module;

The communication module in the security module can be but not limit to be Universal Asynchronous Receiver/Transmitter (UART) module, Serial Peripheral Interface (SPI) module, Inter-Integrated Circuit (I2C) module or Universal Serial Bus (USB) module.

In Embodiment 2, the security module setting the state of the security module itself as the working mode specifically is the security module transferring the clock of the security module itself to the high-speed clock mode.

For instance, in the case that the security module is in the low-power dissipation mode and waits for being woken up and the clock frequency is 0.07 MHz, the security module transferring the clock to the high-speed clock mode specifically is the clock frequency of the security module is transferred from 0.07 MHz to 2.5 MHz.

In the present invention, the bluetooth module and the security module sets the chips of themselves into the sleep mode when they set the states of them as low-power dissipation mode, and the clock is closed down meanwhile, in this way, the power dissipation can be lower. In the case that the chips are not set in the sleep mode and just the clock is closed down, the chips will execute working program; and the chips will stop from executing working program after the chips are set in the sleep mode.

Furthermore, when the security module sets the state of the security module itself as the working mode, the method further includes the security module starts the dependent modules of the security module itself. For instance, the security module starts the communication module and the algorithm module. In the present invention, the algorithm module and the communication module in the security module can inset in the chip of the security module or connect to the chip of the security module. Furthermore, when the security module sets the state of the security module itself as the working mode, the method further includes that the security module starts the peripheral units connecting to itself, for instance, the displaying module connecting to the security module is started.

In Embodiment 2, the bluetooth module setting the state of Bluetooth module itself as the working mode specifically includes the bluetooth module starts the communication module of bluetooth module itself.

Furthermore, when the bluetooth module sets the state of bluetooth module itself as the working mode, the method further includes the bluetooth module transfers the clock of bluetooth module itself into the high-speed clock mode. For instance, the bluetooth module transfers the clock frequency of the clock from 0.07 MHz to 2.5 MHz. Furthermore, when the bluetooth module sets the state of bluetooth module itself as the working mode, the method further includes the bluetooth module starts the peripheral units connecting to bluetooth module itself.

In Embodiment 2, the bluetooth module waking up the security module specifically is the bluetooth module lowers a level of a first control pin, which is connected to the security module. For instance, the first control pin connecting the bluetooth module with the security module is com-bus control line. Optionally, Embodiment 2 further, includes the bluetooth module pulls up the level of the first control pin in the preset duration after the bluetooth module lowers the level of the first control pin connecting to the security module. For instance, the bluetooth pulls up the level of the first control pin in 10 ms after the bluetooth module lowers the level of the first control pin connecting to the security module.

In Embodiment 2, the peripheral units of the bluetooth security device include the displaying module but not limited to be the displaying module, the displaying module connects to the security module but not limits to this way of connection. For instance, the displaying module can connect to the security module and/or the bluetooth module.

In Embodiment 2, when the security module is in the off mode, the security module is powered off, when the bluetooth module is woken up, the security module is powered on, which specifically is that the bluetooth module supports powers to the security module via LDO or MOS, and then the security module sets the clock as the high-speed clock mode, and initializes the hardware;

When the security module is in the deep-sleep mode, the main nucleus of the security chip in the security module is powered off, the peripheral units connecting to the security module are closed down, meanwhile, the algorithm module connecting to the security module and dependent module are closed down, only the waking up module in the security module has power, the security module is woken up by the waking up module after being woken up by the bluetooth module, the main nucleus of the chip of the security module is powered on, and the clock is set in the high-speed clock mode;

When the security module is in the low-power dissipation standby mode, the security module just closes down the peripheral units which dissipates much power, the chip of the security module has power, the clock is in the low-speed clock mode, and the chip of the security module is set in the sleep mode, when the data from the upper computer is received, the clock is set in the high-speed clock mode.

In Embodiment 2, when the bluetooth module is in the off mode, the bluetooth module is powered off, and the bluetooth chip is powered on then a starting up event is received, specifically, the bluetooth module receiving the starting up event is that after the user presses down the starting up button, the starting up event is triggered; the clock is set in the high-speed clock mode, and the hardware is initialized, which includes device such as capacitance;

The bluetooth module is in the deep-sleep mode, the chip in the bluetooth module is powered off, the peripheral units connecting to the bluetooth module is closed down, meanwhile, the dependent modules in the bluetooth module, such as communication modules SPI/UART/I2C, is closed down, just the waking up module in the bluetooth module has power, when the starting up event is received, the bluetooth module is woken up via the waking up module, the main nucleus of the bluetooth chip is powered on, and the clock is set in the high-speed clock mode;

When the bluetooth module is in the low-power dissipation standby mode, the bluetooth module just closes down the peripheral units which dissipate much power, the chip of the bluetooth module has power, the clock is set in the low-speed clock mode, and the chip of the bluetooth module is in the sleep mode, when the data from the upper computer is received, the clock is set in the high-speed clock mode.

In prior art, after being woken up by an upper computer, the bluetooth security device can enter into the low-power dissipation standby mode after a preset duration, comparing to the solution in the prior art, the method in the present invention can save more energy; additionally, in the present invention, the security module and the bluetooth module set the clocks of themselves in a low-speed clock mode when they are in the low-power dissipation standby mode, meanwhile, they close down the peripheral units connecting to them and dependents modules of themselves, in this way, more energy can be saved. The security module and the bluetooth module enter into the deep power saving mode when the bluetooth connection is disconnected by the bluetooth module, thus, the method can save more energy.

Embodiment 3

Figure 5:
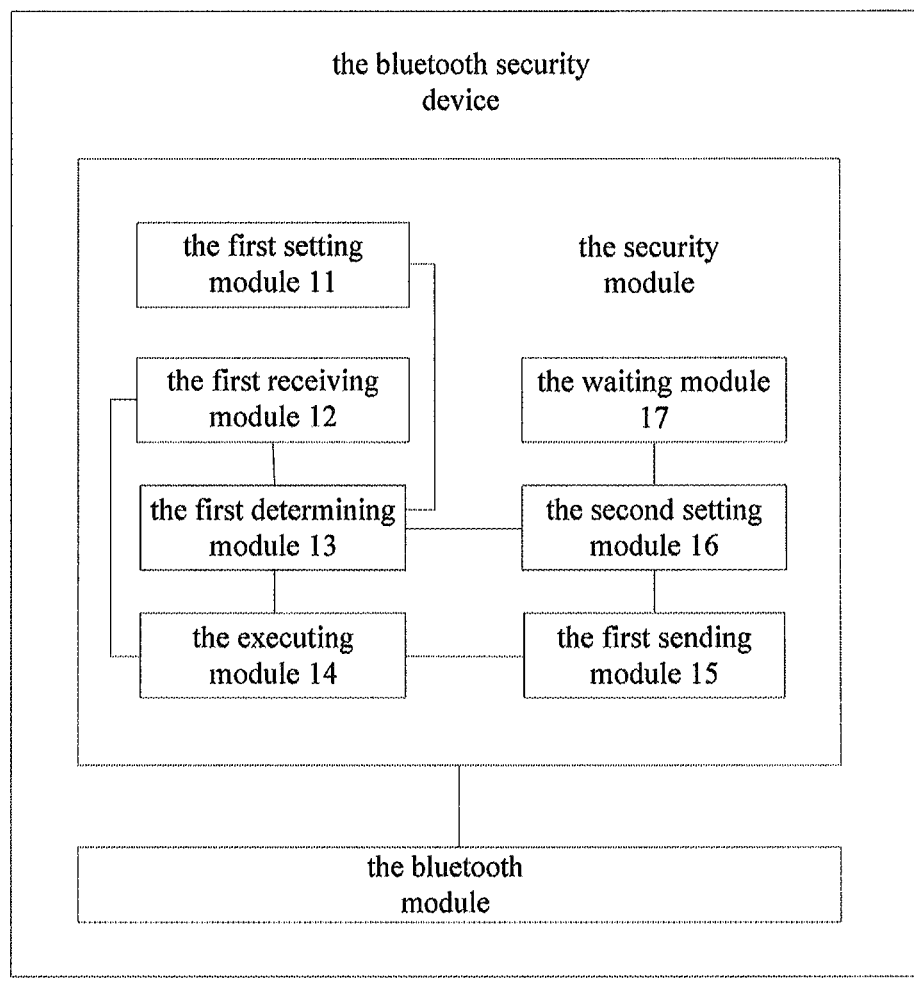
FIG. 5 shows a block diagram of modules in a bluetooth security device according to Embodiment 3 of the present invention.

It provides a bluetooth security device according to the present invention, including a security module and a bluetooth module, as shown as in FIG. 5, it is a block diagram indicating modules in the bluetooth security module, in which, the security module includes a first setting module 11, a first receiving module 12, a first determining module 13, an executing module 14, a first sending module 15, a second setting module 16 and a waiting module 17;

the first setting module 11 is configured to set the state of the security module as the working mode when the security module is woken up by the bluetooth module;

the first receiving module 12 is configured to receive the data from the bluetooth module;

the first determining module 13 is configured to determine whether the first receiving module 12 receives the data from the bluetooth module in the fifth preset duration after the first setting module 11 sets the state of the security module as the working mode;

the executing module 14 is configured to execute corresponding operation according to the data received by the first receiving module 12 to obtain a processed result when the first determining module 13 determines that the first receiving module 12 receives the data from the bluetooth module;

the first sending module 15 is configured to return the processed result obtained by the executing module 14 to the bluetooth module;

the second setting module 16 is configured to set the state of the security module in the low-power dissipation standby mode when the first determining module 13 determines that the first receiving module 12 does not receive the data from the bluetooth module in the fifth preset duration; to set the state of the security module in the low-power dissipation standby mode after the first sending module 15 returns the processed result to the bluetooth module;

the waiting module 17 is configured to wait for the security module being woken up by the bluetooth module after the second setting module 16 sets the state of the security module in the low-power standby mode.

Figure 6:
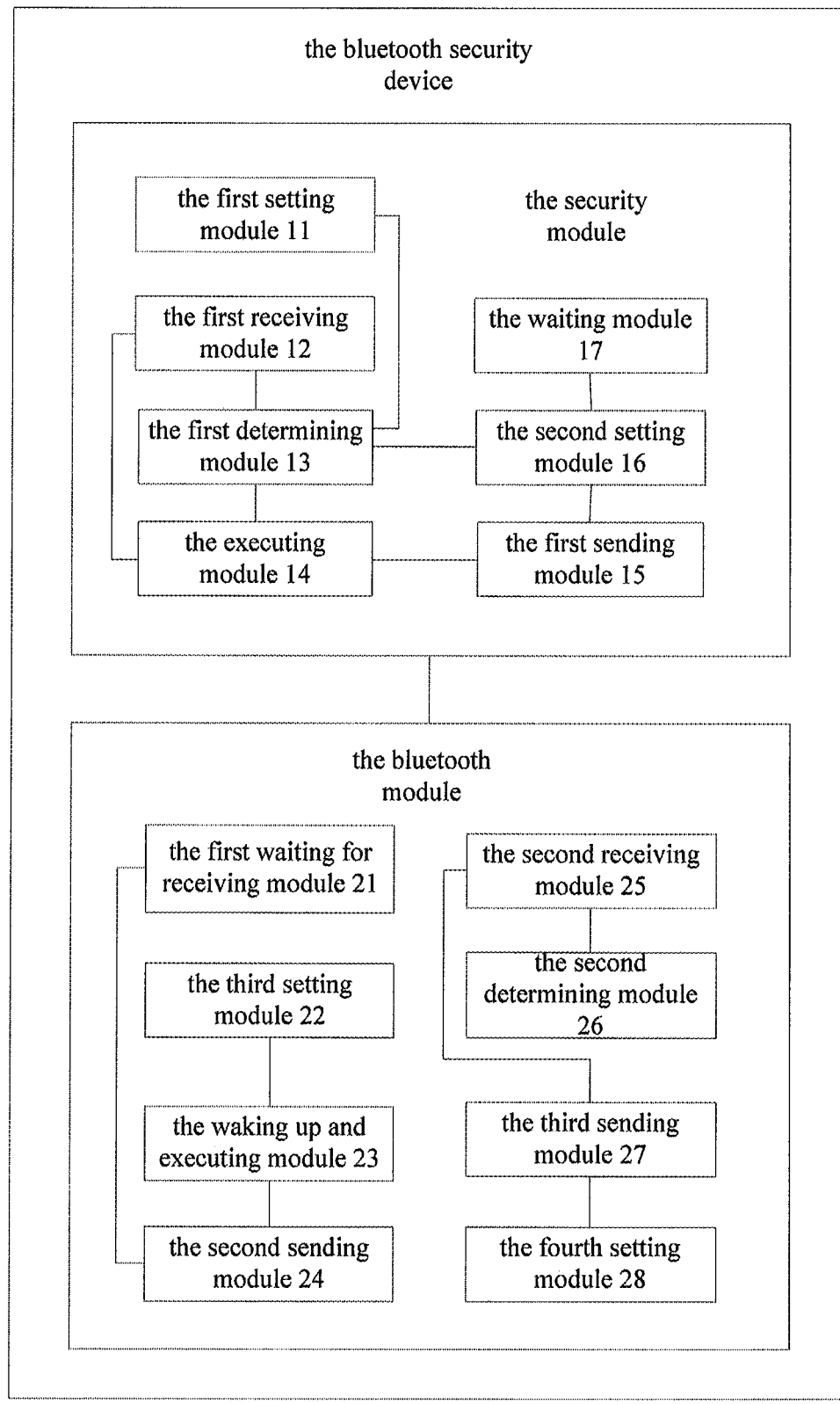
FIG. 6 shows a block diagram of modules in a bluetooth security device according to Embodiment 3 of the present invention.

Furthermore, as shown in FIG. 6, it is a block diagram of modules in the bluetooth security device, in which, the bluetooth module includes a first waiting for receiving module 21, a third setting module 22, a waking up and executing module 23, a second sending module 24, a second receiving module 25, a second determining module 26, a third sending module 27 and a fourth setting module 28;

the first waiting for receiving module 21 is configured to wait for receiving the data from the upper computer;

the third setting module 22 is configured to set the state of the bluetooth module as the working module when the first waiting for receiving module 21 receives the data from the upper computer;

the waking up and executing module 23 is configured to wake up the security module after the third setting module 22 sets the state of the bluetooth module as the working mode;

the second sending module 24 is configured to send the data received by the first waiting for receiving module 21 from the upper computer to the security module after a first preset duration from the time for the waking up and executing module 23 waking up the security module;

the second receiving module 25 is configured to receive the processed result from the security module;

the second determining module 26 is configured to determine whether the second receiving module 25 receives the processed result from the security module in the second preset duration after the second sending module 24 sends the data received by the first waiting for receiving module 21 from the upper computer to the security module;

the third sending module 27 is configured to send the processed result received by the second receiving module 25 after the second determining module 26 determines that the second receiving module 25 receives the processed result from the security module in the second preset duration;

the fourth setting module 28 is configured to set the state of the bluetooth module as the low-power dissipation standby mode after the third sending module 24 sends the processed result received by the second receiving module 25 to the upper computer; to set the state of the bluetooth module as the low-power dissipation standby mode after the second determining module 26 determines that the second receiving module 25 does not receive the processed result from the security module in the second preset duration;

the first waiting for receiving module 21 is further configured to wait for receiving the data from the upper computer after the fourth setting module 28 sets the state of the bluetooth as the low-power dissipation standby mode.

Furthermore, the bluetooth module further includes a third determining module, an organizing module, a fourth sending module, a second waiting for receiving module and a fifth setting module;

the third determining module is configured to determine whether the bluetooth connection is disconnected after the third sending module 27 sends the processed result to the upper computer;

correspondingly, the fourth setting module 28 is specifically configured to set the state of the bluetooth module as the low-power dissipation standby module when the third determining module determines that the bluetooth connection is not disconnected;

the organizing module is configured to organize a disconnecting instruction when the third determining module determines that the bluetooth connection is disconnected;

correspondingly, the waking up and executing module 23 is further configured to wake up the security module when the third determining module determines that the bluetooth connection is disconnected or after the organizing module organizes the disconnecting instruction;

the fourth sending module is configured to send the disconnecting instruction to the security module when the third determining module determines that the bluetooth connection is disconnected and after the third preset duration which the waking up and executing module 23 wakes up the security module;

the second waiting for receiving module is configured to receive a response of the disconnecting instruction from the security module;

the fifth setting module is configured to set the state of the bluetooth module as the deep power saving mode in the fourth preset duration which the fourth sending module sends the disconnecting instruction to the security module and when the second waiting for receiving module receives the response of the disconnecting instruction from the security module;

correspondingly, the security module further includes a fourth determining module, a response-organizing module, a response-sending module;

the fourth determining module is configured to determine whether the data received by the first receiving module 12 is the disconnecting instruction;

the response-organizing module is configured to organize the response of the disconnecting instruction when the fourth determining module determines that the data received by the first receiving module 12 is the disconnecting instruction;

the response-sending module is configured to return the response of the disconnecting instruction organized by the response-organizing module to the bluetooth module;

the executing module 14 is specifically configured to execute corresponding operation to obtain the processed result according to the data received by the first receiving module 12 when the fourth determining module determines that the data received by the first receiving module 12 is not the disconnecting instruction.

Furthermore, the security module includes a sixth setting module as well as the fourth determining module, the response-organizing module, the response-sending module;

the fifth setting module is specifically configured to set the state of the bluetooth module as the deep-sleep mode in the fourth preset duration which the fourth sending module sends the disconnecting instruction to the security module and when the second waiting for receiving module receives the response of the from the security module;

the sixth setting module is configured to set the state of the security module as the deep-sleep mode after the response-sending module returns the disconnecting module to the bluetooth module.

Furthermore, the bluetooth security device includes peripheral units; correspondingly, the fifth setting module is specifically configured to close down the peripheral units connecting to the bluetooth module, keep the waking up module of the bluetooth module having power and power off the main nucleus of the chip of the bluetooth module;

Correspondingly, the sixth setting module is specifically configured to close down the peripheral units connecting to the security module and dependent modules in the security module, keep the waking up module of the security module has power, and power down the main nucleus of the chip of the security module after the response-sending module returns the response of the disconnecting instruction to the bluetooth module.

In Embodiment 3, the peripheral units in the bluetooth module can be but not limit to be the displaying module, the displaying module can but not limit to connect to the security module, for instance, the displaying module connects to the security module and/or the bluetooth module.

In Embodiment 3, the fifth setting module is specifically configured to execute shutdown operation in the fourth preset duration which the fourth sending module sends the disconnecting instruction to the security module and when the second waiting for receiving module receives the response of the disconnecting instruction from the security module.

In Embodiment 3, the fifth setting module can specifically include a fifth waiting for determining sub-module, a fifth setting sub-module, a fifth timeout-determining sub-module and a fifth sending sub-module;

the fifth waiting for determining sub-module is configured to wait for a fourth preset sub-duration and determine whether the second waiting for receiving module receives the response of the disconnecting instruction from the security module after the fourth sending module sends the disconnecting instruction to the security module;

the fifth setting sub-module is configured to set the state of the bluetooth module as the deep power saving mode when the fifth waiting for determining sub-module determines that the second waiting for receiving module receives the response of the disconnecting instruction from the security module;

the fifth timeout determining sub-module is configured to determine whether the duration between the time for the fourth sending module sending the disconnecting instruction to the security module for the first time and the current time is longer than the fourth preset duration when the fifth waiting for determining sub-module determines that the second waiting for receiving module does not receive the response of the disconnecting instruction from the security module;

the fifth sending sub-module is configured to re-send the disconnecting instruction to the security module when the fifth timeout determining sub-module determines that the duration between the time for the fourth sending module sending the disconnecting instruction to the security module for the first time and the current time isn't longer than the fourth preset duration;

the fifth waiting for determining sub-module is configured to determine whether the second waiting for receiving module receives the response of the disconnecting instruction from the security module after the fourth preset duration which the fifth sending sub-module re-send the disconnecting instruction to the security module.

Furthermore, the fourth setting module 28 is further configured to set the state of the bluetooth module as the low-power dissipation standby mode when the fifth timeout determining sub-module determines that the duration between the time for the fourth sending module sending the disconnecting instruction to the security module for the first time and the current time is longer than the fourth preset duration;

Or, the fifth setting sub-module is further configured to set the state of the bluetooth module as the deep power saving mode when the fifth timeout determining sub-module determines that the duration between the time for the fourth sending module sending the disconnecting instruction to the security module for the first time and the current time is longer than the fourth preset duration.

In Embodiment 3, the second determining module 26 can specifically include a second waiting for determining sub-module, a second timeout determining sub-module and a re-sending sub-module;

the second waiting for determining sub-module is configured to determine the second receiving module 25 receives the processed result from the security module after the second sub-preset duration in which the second sending module 24 sends the data received by the first waiting for receiving module 21 from the upper computer to the security module;

correspondingly, the third sending module 27 is specifically configured to send the processed result received by the second receiving module 25 to the upper computer when the second for determining module determines that the second receiving module 25 receives the processed result from the security module in the preset duration;

the second timeout determining sub-module is configured to determine whether the duration between the time for the second sending module 24 sending the data from the upper computer to the security module for the first time and the current time is longer than the second preset duration when the second waiting for determining sub-module determines that the second receiving module 25 does not receive the processed result from the security module;

the fourth setting module 28 is specifically configured to set the state of the bluetooth module as the low-power dissipation standby mode when the second timeout determining sub-module determines that the duration between the time for the second sending module 24 sending the data to the security module for the first time and the current time is longer than the second preset duration;

the re-sending sub-module is configured to re-send the data received by the first waiting for receiving module 21 from the upper computer to the security module when the second timeout determining sub-module determines that the duration between the time for the second sending module 24 sending the data from the upper computer to the security module for the first time and the current time isn't longer than the second preset duration;

the second waiting for determining sub-module is further configured to determine whether the second receiving module 25 receives the processed result from the security module after waiting for the second preset sub-duration which the re-sending sub-module sends the data from the upper computer to the security module.

In Embodiment 3, the third setting module 22 is specifically configured to start the dependent modules in the bluetooth module when the first waiting for receiving module 21 receives the data from the upper computer. Furthermore, the third setting module 22 is further configured to set the clock of the bluetooth module as the high-speed clock mode when the first waiting for receiving module 21 receives the data from the upper computer.

In Embodiment 3, the fourth setting module 28 is specifically configured to close down the dependent modules in the bluetooth module. Furthermore, the fourth setting module 28 is further configured to set the clock of the bluetooth module as the low-speed clock mode, and set the chip in the bluetooth module as the sleep mode.

In Embodiment 3, the waking up and executing module 23 is specifically configured to lower down the level of the first control pin which connects to the security module.

Optionally, the bluetooth module in Embodiment 3 further includes a finish-sending-determining module as well as the first waiting for receiving module 21, the third setting module 22, the waking up and executing module 23, the second sending module 24, the second receiving module 25, the second determining module 26, the third sending module 27 and the fourth setting module; the finish-sending-determining module is configured to determine whether the sending-finished flag is set when the third sending module 27 sends the processed result received by the second receiving module 25 to the upper computer;

Correspondingly, the fourth setting module 28 is specifically configured to set the state of the bluetooth as the low-power dissipation standby mode when the finish-sending-determining module determines that the sending-finished flag is set;

The finish-sending-determining module is further configured to continue to determine whether the sending-finished flag is set when the sending-finished flag is not set.

Furthermore, the bluetooth module further includes a timeout-determining module which is configured to determine the duration between the time for the second receiving module 25 receives the processed result from the security module and the current time is longer than the sixth preset duration when the finish-sending-determining module determines that the sending-finished flag is set;

Correspondingly, the fourth setting module 28 is further configured to set the state of the bluetooth module as the low-power dissipation standby mode when the timeout determining module determines that the duration between the time for the second receiving module 25 receiving the processed result from the security module and the current time is longer than the sixth preset duration;

The finish-sending-determining module is specifically configured to determine whether the sending-finished flag is set when the timeout determining module determines that the duration between the time for the second receiving module 25 receiving the processed result from the security module and the current time isn't longer than the sixth preset duration.

Optionally, the bluetooth further include a process-controlling-determining module and a process-controlling-setting module as well as the first setting module 11, the first receiving module 12, the first determining module 13, the executing module 14, the first sending module 15, the second setting module 16 and the waiting module 17;

The process-controlling-determining module is configured to determine whether the process-controlling is set according to the data received by the first receiving module 12 when the first determining module 13 determines that the first receiving module 12 receives the data from the bluetooth module in the fifth preset duration;

The process-controlling-setting module is configured to use the low-power dissipation timer to set the process-controlling timer according to the data received by the first receiving module 12 when the process-controlling-determining module determines that the process controlling needs to be set.

Furthermore, the security module further includes an executing-saving module besides the process-controlling-determining module and the process-controlling-setting module;

Correspondingly, the first setting module 11 is further configured to set the state of the security module as the working mode when the security module is woken up by the process-controlling timer set by the process-controlling-setting module;

The executing-saving module is configured to execute corresponding operation to obtain a processed result and save the processed result when the security module is woken up by the process-controlling timer set by the process-controlling-setting module and after the first setting module 11 sets the state of the security module as the working mode;

The second setting module 16 is further configured to set the state of the security module as the low-power dissipation standby mode after the executing-saving module saves the processed result.

Optionally, the bluetooth security device further include buttons, and the security module further include an executing-saving module on the basis of including the first setting module 11, the first receiving module 12, the first determining module 13, the executing module 14, the first sending module 15, the second setting module 16 and the waiting module 17;

The first setting module 11 is further configured to set the state of the security module as the working mode when the security module is woken up by a button.

The executing-saving module is configured to execute corresponding operation to obtain the processed result and save the processed result when the security module is woken up by the button and after the first setting module 11 set the state of the security module as the working mode;

The second setting module 16 is further configured to set the state of the security module as the low-power dissipation standby mode after the executing-saving module saves the processed result.

In the bluetooth security device in Embodiment 3, the first determining module 13 in the security module can specifically include a first determining sub-module, a waiting sub-module and a first timeout determining sub-module;

The first determining sub-module is configured to determine whether the first receiving module 12 receives the data from the bluetooth module after the first setting module 11 sets the state of the security module as the working mode;

The executing module 14 is specifically configured to execute corresponding operation according to the data received by the first receiving module 12 to obtain the processed result when the first determining sub-module determines that the first receiving module 12 receives the data from the bluetooth module;

The first timeout determining sub-module is configured to determine whether the duration between the time for the first setting module 11 setting the state of the security module as the working mode and the current time is longer than the fifth preset duration when the first determining sub-module determines that the first receiving module 12 does not receive the data from the bluetooth module;

Correspondingly, the second setting module 16 is specifically configured to set the state of the security module as the low-power dissipation standby mode when the first timeout determining sub-module determines that the duration between the time for the first setting module 11 setting the state of the security module as the working mode and the current time is longer than the fifth preset duration;

The first determining sub-module is further configured to wait for the fifth preset sub-duration and determine whether the first receiving module 12 receives the data when the first timeout module determines that the duration between the time for the first setting module 11 setting the state of the security module as the working mode and the current time isn't longer than the fifth preset duration.

In Embodiment 3, the first setting module 11 is specifically configured to set the clock of the security module as the high-speed clock and start up the dependent modules in the security module when the security module is woken up. Furthermore, the first setting module 11 can be further configured to start up the peripheral units connecting to the security module when the security module is woken up in the case that the bluetooth includes the peripheral units.

In Embodiment 3, the bluetooth security device further includes peripheral units;

The second setting module 16 is specifically configured to set the clock of the security module as the low-speed clock mode, close down the dependent modules in the security module and the peripheral units connecting to the security module, and set the chip in the security module as the sleep mode.

Compared with the prior art, the advantage of the present invention is that the security module in the bluetooth security device sets the state of bluetooth security device itself as the low-power dissipation standby mode immediately when the security module determines that no data is received and after the processed result is returned to the bluetooth module, the present invention will save more power than the method in the prior art, and prolongs the duration of standby of the bluetooth security device.

The security module will enter the low-power dissipation standby mode immediately after processing corresponding operation, meanwhile, the bluetooth module will enter the low-power dissipation standby mode immediately after returning the processed result from the security module to the upper computer, the method in the present invention can prolong the duration of standby of the bluetooth security device compared with the prior art.

Additionally, compared with the prior art which just close down the low-power dissipation standby mode of the peripheral devices, the clock of the security module and the clock of the bluetooth module will changed into the low-speed clock mode when the security module and the bluetooth module is in the low-power dissipation standby mode according to the present invention.

The above embodiments are preferably detailed description of embodiments, all of changes and substitutes by those skilled in the art without innovative work belong to scope of protection of the present invention.

The invention claimed is:

1. A method for dealing with a mobile payment for realizing a low-power dissipation standby of a bluetooth security device comprising a means for making security and a means for performing a bluetooth between a security device and an upper computer, wherein said method comprises the following steps:
   Step S1, waking up, by the means for performing bluetooth, the means for making security, and setting a state of the means for making security as a working mode;
   Step S2, determining, by the means for making security, whether data from the means for performing bluetooth is received in a fifth preset duration, if yes, going to Step S3; otherwise, going to Step S5;
   Step S3, executing, by the means for making security, corresponding operation according to the data received so as to obtain a processed result;
   Step S4, returning, by the means for making security, the processed result to the means for performing bluetooth, and going to Step S5; and
   Step S5, setting, by the means for making security, the state of the means for making security as a low-power dissipation standby mode, and waiting for being woken up by the means for performing bluetooth.

2. The method as claimed in claim 1, wherein said method further comprises:
   Step H1, waiting, by the means for performing bluetooth, for receiving data from an upper computer;
   Step H2, setting, by the means for performing bluetooth, a state of the means for performing bluetooth as the working mode and waking up the means for making security when the data from the upper computer is received from the means for performing bluetooth;
   Step H3, sending, by the means for performing bluetooth, the data from the upper computer to the means for making security after a first preset duration;
   Step H4, determining, by the means for performing bluetooth, whether the processed result from the means for making security is received in a second preset duration, if yes, sending the processed result to the upper computer, and going to Step H5; otherwise, directly going to Step H5;
   Step H5, setting, by the means for performing bluetooth, the state of the means for performing bluetooth as the low-power dissipation standby mode, and going to Step H1.

3. The method as claimed in claim 2, wherein, after the means for performing bluetooth sends the processed result to the upper computer, and before Step H5, said method further comprises:

Step A1, determining, by the means for performing bluetooth, whether a bluetooth connection is disconnected, if yes, organizing a disconnecting instruction, waking up the means for making security, and going to Step A2; otherwise, going to Step H5;
   Step A2, sending, by the means for performing bluetooth, the disconnecting instruction to the means for making security after a third preset duration; and
   Step A3, setting, by the means for performing bluetooth, the state of the means for performing bluetooth as a deep-power saving mode when the means for performing bluetooth receives the disconnecting instruction from the means for making security within a fourth preset duration.

4. The method as claimed in claim 3, wherein, after Step S2 and before Step S3, said method further comprises that determining, by the means for making security, whether the data received is the disconnecting instruction, if yes, going to Step S6; otherwise, going to Step S3;
   Step S6, organizing, by the means for making security, a response of the disconnecting instruction, and returning the response of the disconnecting instruction to the means for performing bluetooth.

5. The method as claimed in claim 4, wherein, the means for performing bluetooth setting the state of the means for performing bluetooth as the deep-power saving mode specifically comprises that setting, by the means for performing bluetooth, the state of the means for performing bluetooth as the deep-sleep mode;
   after Step S6, the method further comprises that setting, by the means for making security, the state of the means for making security as a deep-sleep mode.

6. The method as claimed in claim 3, wherein, the means for performing bluetooth setting the state of the means for performing bluetooth as the deep-power saving mode specifically comprises that executing, by the means for performing bluetooth, a shutdown operation.

7. The method as claimed in claim 2, wherein, the means for performing bluetooth setting the state of the means for performing bluetooth as the working mode specifically comprises that starting up, by the means for performing bluetooth, dependent associates of the means for performing bluetooth,
   setting a clock of the means for performing bluetooth as a high-speed clock mode;
   the means for performing bluetooth setting the state of the means for performing bluetooth as the low-power dissipation standby mode specifically comprises that the means for performing bluetooth closing down the dependent associates of the means for performing bluetooth,
   setting the clock of the means for performing bluetooth as a low-speed clock, and setting a chip of the means for performing bluetooth as a sleep mode.

8. The method as claimed in claim 1, wherein, when the means for making security determining whether the data from the means for performing bluetooth is received within the fifth preset duration in Step S2, and before Step S4, said method further comprises:
   determining, by the means for making security, whether a process-controlling is set according to the received data, and using a low-power dissipation timer to set a process-controlling timer according to the received data in the case that the determining result is that the process-controlling is set.

9. The method as claimed in claim 8, wherein said method further comprises:

when the means for making security is woken up by the process controlling timer, setting, by the means for making security, the state of the means for making security as the working mode, and executing the corresponding operation so as to obtain the processed result and saving the processed result, and then setting the state of the means for making security as the low-power dissipation standby mode.

10. The method as claimed in claim 1, wherein said method further comprises:

when the means for making security is woken by a button, setting, by the means for making security, the state of the means for making security as the working mode, executing the corresponding operation so as to obtain the processed result, saving the processed result and setting the state of the means for making security as the low-power dissipation standby mode.

11. The method as claimed in claim 1, wherein, the means for making security setting the state of the means for making security as the working mode specifically comprises: setting, by the means for making security, a clock of the means for making security as the high-speed dock mode, and starting up dependent associates of the means for making security;

the means for making security setting the state of the means for making security as the low-power dissipation standby mode specifically comprises: setting, by the means for making security, the clock of the means for making security as the low-speed clock mode, closing down the dependent associates of the means for making security and peripheral units connecting to the means for making security, and setting a chip of the means for making security as the sleep mode.

\* \* \* \* \*